(12) United States Patent
Rajeevalochana et al.

(10) Patent No.: US 9,363,734 B2
(45) Date of Patent: Jun. 7, 2016

(54) SYSTEM AND METHOD FOR PREVENTING PHONE FUNCTIONALITY WHILE DRIVING

(71) Applicants: Aswin Rajeevalochana, Princeton Junction, NJ (US); Radha Raghunathan, Princeton Junction, NJ (US)

(72) Inventors: Aswin Rajeevalochana, Princeton Junction, NJ (US); Radha Raghunathan, Princeton Junction, NJ (US)

( * ) Notice: Subject to any disclaimer, the term of this patent is extended or adjusted under 35 U.S.C. 154(b) by 0 days.

(21) Appl. No.: 14/921,255

(22) Filed: Oct. 23, 2015

(65) Prior Publication Data

US 2016/0044575 A1 Feb. 11, 2016

Related U.S. Application Data (63) Continuation-in-part of application No. 14/215,627, filed on Mar. 17, 2014, now Pat. No. 9,198,113.

(60) Provisional application No. 61/793,823, filed on Mar. 15, 2013.

(51) Int. Cl.
*H04M 3/00* (2006.01)
*H04W 48/04* (2009.01)
*H04W 8/24* (2009.01)
*H04M 1/725* (2006.01)
*B60Q 1/54* (2006.01)

(52) U.S. Cl.
CPC .............. *H04W 48/04* (2013.01); *H04W 8/245* (2013.01); *B60Q 1/54* (2013.01); *H04M 1/72519* (2013.01)

(58) Field of Classification Search
CPC ..... H04W 8/245; H04W 1/609; H04W 12/12; H04M 1/72519; B60Q 1/54

USPC ............. 455/418, 410, 550.1, 569.2; 340/441
See application file for complete search history.

(56) References Cited

U.S. PATENT DOCUMENTS

| | | | |
|---|---|---|---|
| 6,771,946 B1 | 8/2004 | Oyaski | |
| 8,548,441 B1 | 10/2013 | Jones et al. | |
| 9,037,125 B1* | 5/2015 | Kadous | H04M 1/72577 455/418 |
| 2003/0109246 A1 | 6/2003 | Shimizu et al. | |
| 2004/0209594 A1 | 10/2004 | Naboulsi | |
| 2009/0002147 A1 | 1/2009 | Bloebaum et al. | |
| 2010/0297929 A1 | 11/2010 | Harris | |
| 2011/0021234 A1 | 1/2011 | Tibbitts et al. | |
| 2011/0111724 A1 | 5/2011 | Baptiste | |
| 2011/0130132 A1 | 6/2011 | Lipovski | |
| 2011/0136509 A1 | 6/2011 | Osann, Jr. | |
| 2011/0294465 A1 | 12/2011 | Inselberg | |
| 2011/0301780 A1 | 12/2011 | Miller et al. | |
| 2012/0046071 A1 | 2/2012 | Brandis et al. | |
| 2012/0071151 A1* | 3/2012 | Abramson | H04L 67/12 455/418 |
| 2012/0214470 A1 | 8/2012 | Tadayon et al. | |

(Continued)

FOREIGN PATENT DOCUMENTS

WO 2010062754 A1 6/2010
WO 2011085250 A1 7/2011

*Primary Examiner* — Danh Le
(74) *Attorney, Agent, or Firm* — Gearhart Law, LLC (57) ABSTRACT

An app designed to prevent using distracting phone functionality, including texting, on a mobile phone while driving a vehicle is disclosed. The app detects and measure attributes including the phone's orientation and change of orientation and expresses them in a coordinate system relative to the direction of motion of the vehicle. If the phone orientation is found to be consistent with a change in direction of the vehicle, or the axis of rotation of the phone is found to be consistent with itself over time, the distracting phone functionality is disabled.

11 Claims, 6 Drawing Sheets

(56) References Cited

U.S. PATENT DOCUMENTS

| | | | |
|---|---|---|---|
| 2012/0214472 A1 | 8/2012 | Tadayon et al. | |
| 2012/0220284 A1 | 8/2012 | Tadayon et al. | |
| 2012/0231773 A1 | 9/2012 | Lipovski | |
| 2012/0244840 A1 | 9/2012 | Vander Veen et al. | |
| 2012/0329444 A1 | 12/2012 | Osann, Jr. | |
| 2013/0344859 A1* | 12/2013 | Abramson | G06Q 50/265 455/418 |
| 2014/0045477 A1 | 2/2014 | Ewell, Jr. et al. | |
| 2014/0207950 A1 | 7/2014 | Badiee et al. | |
| 2014/0335902 A1* | 11/2014 | Guba | H04W 4/027 455/456.4 |
| 2015/0025917 A1* | 1/2015 | Stempora | G06Q 40/08 705/4 |
| 2015/0087264 A1* | 3/2015 | Goyal | G01S 19/34 455/411 |
| 2015/0141043 A1* | 5/2015 | Abramson | G01C 21/34 455/456.1 |
| 2015/0168174 A1* | 6/2015 | Abramson | G01C 21/3697 701/408 |
| 2015/0312404 A1* | 10/2015 | Abramson | H04W 4/027 455/418 |
| 2015/0382156 A1* | 12/2015 | Gruteser | H04W 4/046 455/456.1 |
| 2016/0021238 A1* | 1/2016 | Abramson | H04M 1/72577 455/418 |

* cited by examiner

SYSTEM AND METHOD FOR PREVENTING PHONE FUNCTIONALITY WHILE DRIVING

CLAIM OF PRIORITY

This application is a continuation-in-part of U.S. patent application Ser. No. 14/215,627 filed on Mar. 17, 2014 which in turn claims priority to U.S. provisional application 61/793,823 filed on Mar. 15, 2013, the contents of both of which are hereby incorporated by reference in their entirety.

FIELD OF THE INVENTION

The invention relates to the lock-out of a radiotelephone telecommunications device, and more particularly to an app to prevent a driver of a vehicle from sending or receiving text messages while the vehicle they are driving is in motion.

BACKGROUND OF THE INVENTION

Texting while driving continues to be a significant cause of traffic accidents, despite campaigns to prevent it. The people most at risk appear to be young adults both because they are most proficient at texting and are among the least proficient drivers.

While preventing or deterring a driver of a vehicle from texting or using other distracting features of a mobile phone, it is also an objective not to prevent passengers from texting or using the other features of the phone.

DESCRIPTION OF THE RELATED ART

The relevant prior art includes:

US Patent Application 20120244840 issued to R. Vander Veen et al. on Sep. 27, 2012 entitled "Motion-Based Disabling of Messaging on a Wireless Communications Device" that describes a system in which if a wireless communications device is traveling a speed exceeding a first predetermined threshold but less than a second predetermined threshold, the device is presumed traveling in a motor vehicle. In order to inhibit operation of the wireless communication device when traveling, access to certain device functions or applications such as e-mail, text messaging, etc. are limited by requiring the user of the device to respond correctly to a randomly generated visual challenge, such as, for example, a CAPTCHA (in which a user is prompted to recognize the characters in a visually distorted string of text). This visual challenge presents a sufficient obstacle that the user will be less likely to use the wireless communications device for e-mailing or texting while operating a motor vehicle.

US Patent Application 20100297929 issued to S. Harris on Nov. 25, 2010 entitled "Prevention against Texting and other Keyboard Operations While Driving" that describes a method of prevention against some, but not all, users in a vehicle using the keyboard on a device while driving. This can prevent the driver texting while driving, or can prevent the driver entering the destination on a GPS while driving.

US Patent Application 20040209594 issued to M. Naboulsi on Oct. 21, 2004 entitled "Safety control system for vehicle" that describes a safety control system for vehicles that includes a communication device having at least one input accessible from within the vehicle and an output communicated within the vehicle, at least one sensor operable to sense at least one condition related to vehicle operation, and a controller communicated with the sensor and the communication device to selectively suppress at least one of said input and said output in response to a sensed parameter of said at least one condition being outside of a threshold. When an input is suppressed, the driver is prevented from accessing or inputting information into the communication device. When an output is suppressed, communication between the device and the driver of a vehicle is suppressed to, among other things, avoid distracting the driver during certain driving situations or conditions relating to the driver, vehicle and/or environment.

U.S. Pat. No. 6,771,946 issued to Oyaski on Aug. 3, 2004 entitled "Method of preventing cell phone use while vehicle is in motion" that describes a method for preventing a driver of a motor vehicle from using a cellular telephone while the motor vehicle is in motion. The invention comprises a step of determining a position of the gear shift lever in such motor vehicle and generating a first signal when the position of such gear shift lever is moved to and remains in one of drive, overdrive, second, low, and reverse. Another step involves transmitting such signal generated in a previous step to a means disposed in a predetermined location on such motor vehicle for generating a reverse phase signal. Another step involves generating such reverse phase signal when such first signal is received by such means. A next step is transmitting such reverse phase signal for a predetermined radius from such predetermined location. A last step is preventing any cellular telephone transmission within such predetermined radius when such reversed phase frequency signal is being transmitted.

Various implements are known in the art, but fail to address all of the problems solved by the invention described herein. Embodiments of this invention are illustrated in the accompanying drawings and will be described in more detail herein below.

SUMMARY OF THE INVENTION

An inventive mobile phone app, designed to prevent texting or other distracting uses of the mobile phone while driving a vehicle, is disclosed.

In a preferred embodiment, the app may include machine readable instructions that may be stored on a mobile phone memory. These instructions may, for instance, be programed modules that enable the mobile phone to perform a variety of functions aimed at preventing phone functionality while driving.

A first function may be to detect a velocity at which a mobile phone is travelling. Detecting the speed or velocity of a mobile phone is well-known in the art and may, for instance, be accomplished using a number of methods such as, but not limited to, using the mobile phones directional accelerometers, usually used to orient the image on the screen, to provide a form of inertial navigation, or by using the mobile phones GPS locating devices to observe how quickly a change of location occurs, or a combination thereof. Once the speed is determined to be above a certain threshold, the mobile phone may assume the mobile phone is travelling in a vehicle. 5 mph seems to be a reasonable speed to differentiate between walking and being in a vehicle.

The next step is to determine if a user of a mobile phone is a driver of the travelling vehicle, or merely a passenger. This determination may be achieved by presenting the mobile phone user with a physical-interaction challenge-task that may only be responded to successfully if the user is not engaged in another activity.

In a preferred embodiment, the physical-interaction challenge-task may be a two-hands-required-on-phone task. If the user has two hands on the mobile phone, they can't also be driving. A simple two-hands-required-on-mobile-phone task may, for instance, be to depress and hold a button with one hand, while performing another phone activity, such as, but not limited to, texting, with the other hand. This task may only be done using two hands. If a user can accomplish the task, the assumption may be that they are a passenger and the mobile phone texting, or any other, function will not be disabled. However, if the challenge is not met satisfactorily, the user is assumed to also be a driver of the vehicle, and the texting and other distracting functions may be disabled until the speed of the vehicle is below the threshold speed or a further challenge is satisfactorily met. Other functions such as, but not limited to, dialing, playing games, watching video, talking on the phone and receiving calls, or some combination thereof, may also be disabled in various embodiments of the invention.

This challenge may be made more difficult by using the a combination of movement and orientation capabilities of a mobile phone such as, but not limited to, the inertial sensors, the GPS or a combination thereof, to determine the direction the vehicle is travelling in an the orientation the phone screen is being held with respect to that direction. The challenge may require the phone screen to be held in a certain orientation relative to the direction of travel, such as, but not limited to, parallel to, or visible in from a point of view opposite to the direction of travel. Such a task may be relatively simple for a passenger but would be extremely difficult for a driver.

In the challenge of holding a button down, the button may be a virtual button, and may switch locations after a brief time forcing the user to pay attention. The time to switch locations may be quasi-random, or may be a fixed time interval that may be of about 0.5 seconds.

The button to be depressed may be a real or virtual keyboard key, and the key to be held may be presented as an audio instruction.

In a further preferred embodiment of the invention, the two-hands-required-on-mobile phone task may make use of the mobile phones ability to determine its orientation, and may, for instance, include adjusting the orientation of the phone to maneuver a screen-object that may sliding around the screen under virtual gravity, i.e. sliding as if it were a real object under gravity following the slope of the screen. The screen-object may need to controlled so as to achieve a goal such as, but not limited to, being kept within the boundaries of a moving icon, maneuver through a set of gates that may be fixed or moving or some combination thereof.

In a further preferred embodiment of the invention, the two-hands-required-on-mobile phone task may make use of the mobile phones ability to determine its orientation, and may, for instance, include challenging the user to move, or shake, the phone in a pattern that may be indicated graphically on the screen.

In a further preferred embodiment of the invention, the physical-interaction challenge-task may be a both-eyes-on-mobile phone task that may require the user to look at a graphic object or in a particular direction for a predetermined length of time. That predetermined length of time may, for instance, be as long as 5 to 10 second. This may be long enough so that a user cannot perform the task satisfactorily, text and perform a third task such as driving a vehicle.

The mobile phone may for instance incorporate a camera and an image recognition module that may recognize a location of the user's eyes or a direction in which the user's eyes are looking. The user may, therefore be required to perform a task such as, but not limited to, looking directly at the camera, or at an object on the camera screen for a predetermined time.

In yet another preferred embodiment of the present invention, the cellphone may include a voice recognition module. The user may be presented with one or more lines of text and be required to read the text. The mobile phone may then use well-known speech recognition to monitor both if the text is being read correctly and—using well-known voice recognition—if the text is being read by the user. The predetermined threshold for passing the challenge may, therefore, be a degree of accuracy with which the text is read, the degree of certainty that it is the user reading the text, or a combination thereof.

Therefore, the present invention succeeds in conferring the following, and others not mentioned, desirable and useful benefits and objectives.

It is an object of the present invention to provide a simple but effective way of preventing a driver from both driving and using distracting phone functionality such as, but not limited to, texting.

It is another object of the present invention to allow non-driving passengers of a car the ability to text while in motion while at the same time preventing the driver from using distracting phone functionality such as, but not limited to, texting.

DESCRIPTION OF THE PREFERRED EMBODIMENTS

The preferred embodiments of the present invention will now be described with reference to the drawings. Identical elements in the various figures are identified with the same reference numerals.

Various embodiments of the present invention are described in detail. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
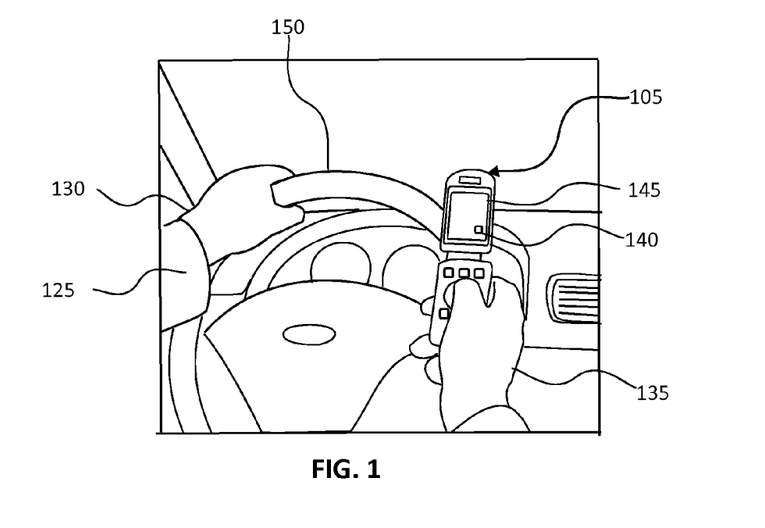
FIG. 1 shows a schematic view of a driver of a car using distracting phone functionality while driving.

FIG. 1 shows a schematic view of a driver of a car using distracting phone functionality such as, but not limited to, texting while driving.

A driver and user 125 of a mobile phone 105 is shown in FIG. 1 with a left hand 130 on a steering wheel 150 and a right hand 135 holding the mobile phone 105 and using distracting phone functionality such as, but not limited to, texting by depressing keys on the phone's keypad. Shown on the mobile phone display 145 is a virtual button 140.

In a preferred embodiment, when a mobile phone 105 may have detected that it may be in motion and traveling at a speed or a velocity that may exceed a preset threshold, then, unless the virtual button 140 may be held, an app on the cell phone may disable one or more of the mobile phone's functions such as, but not limited to, sending or receiving text messages, making or receiving phone calls, playing games, watching videos or some combination thereof.

In order to depress and hold the button 140 the user may require the use of both hands, i.e., one hand to hold the button and the other to press the keys to send a text. As the driver may be unable to drive the car for any extended period with both hands occupied using the phone, this two-hands-required-on-mobile phone, physical-interaction challenge task may prevent the mobile phone user from both driving and sending text messages, or using other distracting phone functionality.

In a preferred embodiment, the two-hands-required-on-mobile phone, physical-interaction challenge task may be made more difficult by additionally moving the virtual button to a different portion of the screen at short time intervals of between a ¼ second and 2 seconds. In a further preferred embodiment of the invention, the location of the button may be moved to a new position every ½ second. The location of the new position may be selected randomly, or in occur at pre-designated positions in a pseudo-random sequence. Similarly the time interval between changes may be varied pseudo-randomly.

Figure 2:
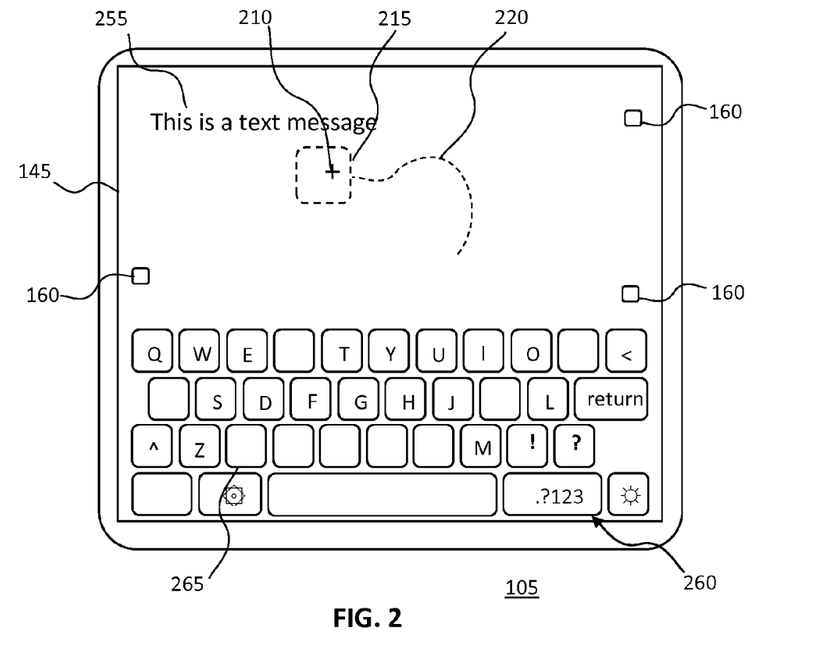
FIG. 2 shows a schematic view of a mobile phone displaying challenges of the present invention designed to prevent using distracting phone functionality while driving.

FIG. 2 shows a schematic view of a mobile phone 105 displaying challenges of the present invention designed to prevent using distracting phone functionality such as, but not limited to, texting while driving.

The mobile phone 105 may, for instance, include an app made up of machine readable instructions that may be stored in the mobile phone's memory. This app or instructions, may enable functions that may prevent the user of the mobile phone from performing distracting tasks such as, but not limited to, sending text messages, presenting the user with a physical-interaction challenge task that may require so much of the user's attention, or the use of both hands, or a combination thereof, so that the user may not be able to both perform the task and drive.

Once the mobile phone 105 has detected that it is travelling at a speed in excess of a threshold speed, such as, but not limited to, 5 mph, the app may issue a challenge. The speed or speed of the mobile phone 105 may, for instance, be determined by one of several well-known methods such as, but not limited to, using GPS location finder, using in-phone accelerometers as an inertial navigation system, or some combination thereof.

One such physical-interaction challenge task may be the two-hands-required-on-mobile phone task described before in which the user may be required to depress and hold a soft button 160. To do this the user may require both hands, one to hold and depress the button, the other to type on the keyboard 260 to produce the text message 255. As both the users hands may be occupied, the user may not be able to drive, perform the task and text at the same time. If the task is not performed adequately, the app may disable the mobile phone's texting capability and any other distracting phone functionality until such time as the task is performed satisfactorily, or the phone may have been travelling at a speed below the threshold speed for a sufficient time, such as, but not limited to, 30 seconds, or a combination thereof.

The button holding task may be made more difficult—and may therefore require more of the user's attention—if the location of the button is moved either continuously or periodically. The soft button 160 may, for instance, drift from one location to another over time. Or the soft button 160 may jump from one location to another. The speed of drifting or the time between jumps may be varied.

In a further preferred embodiment of the invention, the button to be held may be one of the keyboard keys 265. The key to be held may, for instance, be announced as an audio instruction and may also be changed from time to time.

In a further preferred embodiment of the invention, the physical-interaction challenge task may be a two-hands-required-on-mobile phone task that requires adjusting the orientation of the mobile phone 105. Such a task may, for instance, make use of the three-axis MEMs accelerometers available on many mobile phones and which are typically used to determine the orientation of the device in order to display the images or text in the correct direction. Such accelerometers are available on most smart phones, tablets and e-readers, all of which may benefit from the present invention.

A graphic object 210 displayed on the mobile phone display 145 may, for instance, be programmed to move as if it were in a virtual gravity field, i.e., it may be made to slide in a direction of the greatest slope of the display screen and at a speed that may be proportional to the angle of that slope. The graphic object 210 may therefore act similarly to a bubble in a spirit level.

In a preferred embodiment of the present invention, the goal of the challenge may be to keep the graphic object 210 within a defined and moving region 215. As the region traverses a path of movement 220, the user may require one hand to adjust the mobile phone orientation to follow the moving region and the other to text.

The "strength" of the "virtual gravity field" may need to be adjust so that the task may be extremely difficult without both hands, but easy enough for a passenger in a moving car to accomplish while using distracting phone functionality such as, but not limited to, texting. In this way, the app may distinguish between a driver and a passenger.

Figure 3:
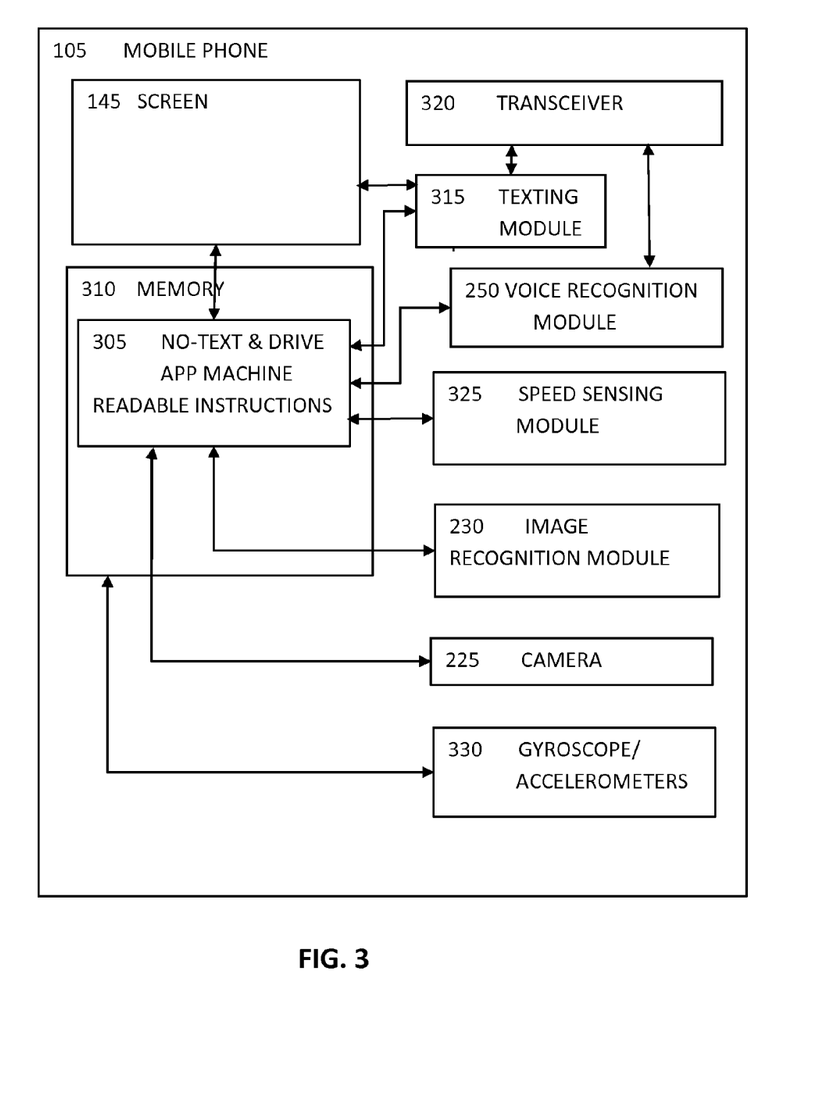
FIG. 3 shows a schematic functional layout of a portion of a mobile phone and functional modules that may be facilitated or used by the app of the present invention.

FIG. 3 shows a schematic functional layout of a portion of a mobile phone 105 and functional modules that may be facilitated or used by the app of the present invention.

The machine readable instructions 305 of the app may, for instance, reside in the mobile phone memory 310.

The machine readable instructions 305 may enable a speed sensing module 325 or may communicate with an existing speed sensing module 325. The speed sensing module 325 may, for instance, rely on well-known methods such as, but not limited to, effectively using, or enabling, a phone gyroscope/accelerometers module 330 as an inertial navigation system, or the GPS location system, or a combination thereof. As humans walk at about 2 mph, any speed above that may be taken as a threshold for preventing using distracting phone functionality such as, but not limited to, texting unless a challenge is met. 5 mph would appear to be a good threshold and is the preferred threshold though any threshold in the range of 3 to 8 mph may be workable.

A further type of physical-interaction challenge-task presented by the app may be a both-eyes-on-mobile-phone-screen task.

In a further preferred embodiment of the invention, the machine readable instructions 305 may access a camera 225 and access or enable an image recognition module 230 on the mobile phone 105. The combination of camera and image recognition may, for instance, be programmed to locate a user's pupils and to use them to determine the direction in which the user is looking.

The both-eyes-on-mobile-phone-screen task may, for instance, be for the user to look at a graphic on the screen for an extended period of time. The length of time may be in a range of 5 to 20 seconds and is preferably at least 10 second may be too long to allow the user to both perform the task and to drive a vehicle. The task may, however, be accomplished with ease by a passenger while using distracting phone functionality such as, but not limited to, texting.

A further both-eyes-on-mobile-phone-screen task may, for instance, be for the user to read one or more lines of text that may be displayed on the mobile phone display 145 by the app. The app may access or enable a voice recognition module 250 that may be trained to recognize the user's voice as well as to recognize words. Monitoring the task may, therefore, include both ensuring that the correct test is read and that it is read by the registered or usual user of the mobile phone.

Control of the texting functionality may be accomplished by the machine readable instructions 305 of the app stored on the transceiver 320 interacting with a texting module 315. The texting module 315 may in turn be interacting with a transceiver 320 in order for the functioning of the mobile phone 105 as a telecommunications device.

Figure 4:
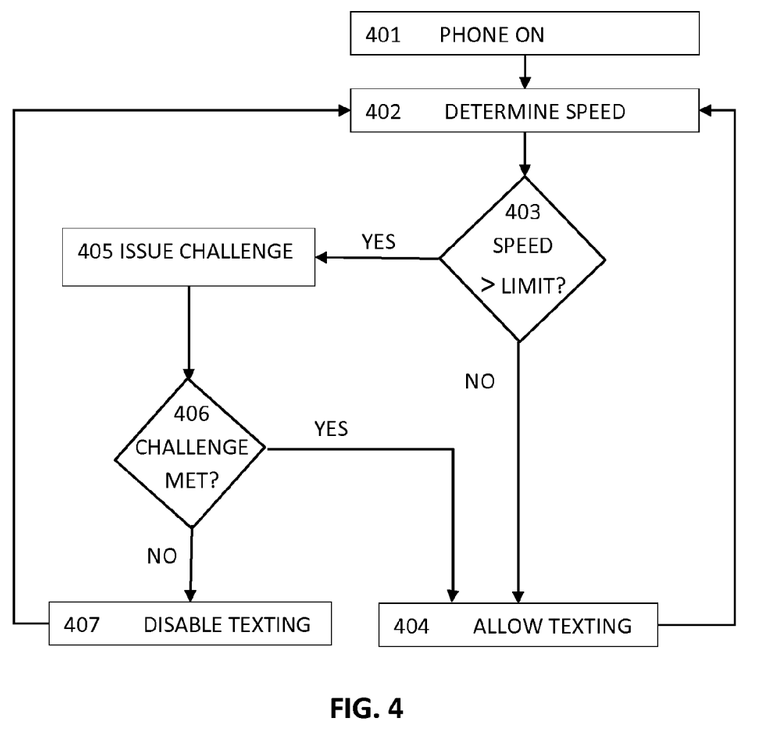
FIG. 4 shows a schematic flow diagram of some of the steps of implementing the app of the present invention.

FIG. 4 shows a schematic flow diagram of some of the steps of implementing the app of the present invention.

In Step 401, a user may turn a cell phone on. This may enable the phone to access voice transceiver towers as well as GPS devices.

In Step 402, the speed at which the phone is travelling may be determined. As detailed above, this may be done using GPS signals, accelerometers in the phone, distances from transmitting towers, or a combination thereof.

In Step 403, having determined the current speed at which the cell phone is traveling, the app may then check to see if that speed exceeds a predetermined limit or threshold. That predetermined limit may, for instance, be determined by the upper limit at which people usually walk. Although champion race walkers can average 9 mph, a brisk walk for a fit young person is 4.0 mph, and most waking is slower. A threshold of 5 mph therefore seems to be reasonable as it is a speed that most people will only achieve when in powered transport of some sort.

The speed of the mobile phone may be determined to be below the threshold speed, in which case the app may proceed to Step 404 and allow the phone to be used for using distracting phone functionality such as, but not limited to, texting.

The speed may, however, be determined to be equal to, or above the threshold, the app may proceed to Step 405 and issue a challenge.

The challenge may, for instance, be a physical-interaction challenge task that involves the phone user to such an extent that they may not be able to perform the task, drive and text at the same time. Examples of such tasks are detailed above and they may fall into two general categories: two-hands-required-on-the-mobile-phone tasks that assume a driver needs at least one hand to be used for steering while driving, and both-eyes-on-mobile-phone-screen tasks that assume that a driver cannot take his eyes off the road for an extended period of time, such as, but not limited to, 10 seconds, and drive safely. By effectively increasing the burden of using distracting phone functionality such as, but not limited to, texting, the app may make using distracting phone functionality such as, but not limited to, texting and driving so dangerous that users may refrain from doing it.

In Step 406 the user's response to the challenge is monitored. If the user has failed to complete the challenge to a required degree of success, the app may proceed to step 407 and disable the texting, or other distracting phone functionality.

The app may then proceed to Step 402 to monitor the current speed.

The challenge may, however, be determined to have been successfully met. In such a case, the app may proceed to Step 404 and allow texting and other distracting phone functionality.

Figure 5:
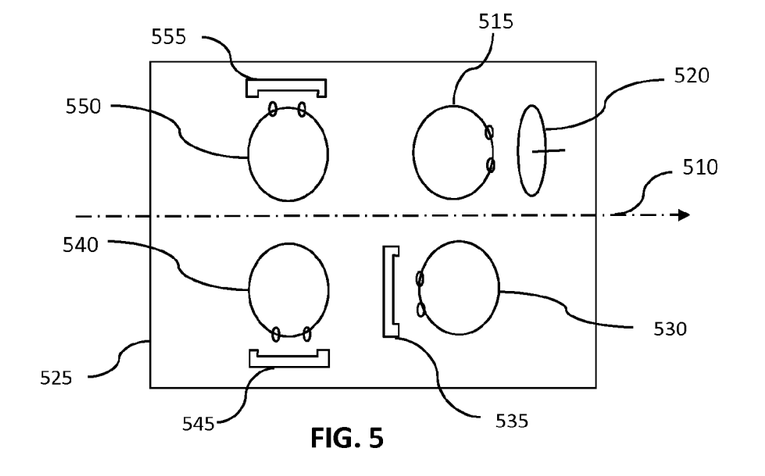
FIG. 5 shows a schematic plan view of a driver and passengers in a vehicle and the orientation of their cell phones relative to the direction of travel.

FIG. 5 shows a schematic plan view of a driver and passengers in a vehicle and the orientation of their cell phones relative to a direction of travel 510 of the vehicle.

The driver 515 is illustrated as being behind a steering wheel 520 looking forward in the direction of travel of the vehicle 525.

A first passenger 530 is shown looking backwards, in the opposite direction to the direction of travel of the vehicle. This enables them to clearly view their cell phone 535 that has its screen oriented such that looking backwards may be the best way to view the screen clearly. Having a cell phone have to be in this orientation in order to show a challenge would make it extremely difficult for a driver to complete the challenge, but would be relatively easy for a passenger to complete.

A second passenger 540 is shown looking at 90 degrees to the right of the direction of travel 510. Their cell phone 545 is oriented so that the plane of the screen is substantially parallel to the direction of travel, and facing in toward the second passenger. Having a cell phone have to be in this orientation in order to show a challenge would make it difficult for a driver to complete the challenge, but would be easy for a passenger to complete.

A third passenger 550 is shown looking at 90 degrees to the left of the direction of travel 510. Their cell phone 555 is oriented so that the plane of the screen is substantially parallel to the direction of travel, and facing in toward the third passenger. Having a cell phone have to be in this orientation in order to show a challenge would make it difficult for a driver to complete the challenge, but would be easy for a passenger to complete.

Although the cellphone screens are shown in three discreet orientations, one of ordinary skill in the art will appreciate that intermediate orientations of the cellphone screens between the ones illustrated may also achieve the goal of making the challenge displayed on the screen easy for a passenger, but difficult if not impossible for the driver.

In yet a further embodiment of the present invention, an app may be designed and implemented to prevent a user using distracting phone functionality while controlling the navigation of the vehicle in the following manner.

The app may access machine readable instructions that may be stored on a mobile phone memory or in the cloud, that enable the mobile phone to perform the following functions.

The phone may detect the orientation and motion of the mobile phone and determine if it is being located adjacent to a direction control element of the vehicle. This may, for instance, indicate if the phone is being located on a steering wheel to steady it while the driver attempts to perform functions on the phone such as, but not limited to, dialing a number, receiving a call, creating a text message, checking an incoming message or some combination thereof.

If the mobile phone motion and orientation are indicative of such a location and motion, the mobile phone may be programed to prevent distracting phone functionality by disabling said mobile phone's distracting phone functionality.

This functionality may, for instance, be enabled by storing various possible orientations and motions of the vehicle's direction control element in a mobile phone memory or in the cloud. The phone may detect the orientation and motion of the mobile phone and determine if they match those of the direction control element of the vehicle. This may, for instance, indicate that the phone is located on a steering wheel in order to steady it while the driver attempts to perform functions on the phone such as, but not limited to, dialing a number, receiving a call, creating a text message, checking an incoming message or some combination thereof.

Figure 6:
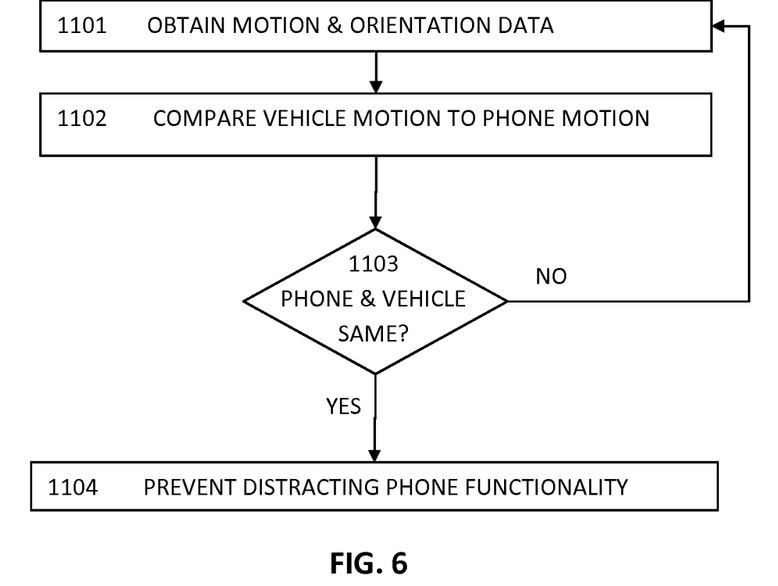
FIG. 6 shows a flow diagram outlining steps relevant to the method of an embodiment of the present invention.

FIG. 6 shows a flow diagram outlining steps relevant to the method of an embodiment of the present invention.

In the embodiment outlined in FIG. 6, user using distracting phone functionality while driving a vehicle may be implemented in four steps.

In Step 1101 "Obtain Motion & Orientation Data" the cell phone may obtain data from sensors mounted in, or connected to, the cell phone. As described in detail below, a typical cell or smartphone contains or has easy access to the data from a number of sensors and sources such as, but not limited to, accelerometer data that measure acceleration but which may be used to calculate or estimate velocity and/or distance, gyroscopic data that may be used to measure orientation and, therefore, change in orientation as typical smartphones contain accurate clocks, magnetic field sensor data that may be used to determine location and orientation and GPS data that may be used to determine position or some combination thereof.

It is also becoming increasingly common for vehicles to independently have the same, or similar sensors, attached to the vehicle and for them to provide vehicle centric data of a same or similar nature that may also be available to other users, including devices such as smartphones, either by plug-in modules or by wireless communication such as, but not limited to, the Blue Tooth™ wireless communications protocol.

In Step 1101 "Compare Vehicle Motion to Phone Motion", a microprocessor on the smartphone may be programmed to compare the motion of the vehicle and the smartphone. Where separate data is available for the vehicle and the smartphone, the comparison of the motion of the smartphone and the vehicle may become a relatively straight forward problem in which key technical challenges may, for instance, be to compare equivalent data and/or to compare data with the least errors.

In situations in which sensor data may be limited to data from smartphone sensors, it may still be possible to estimate vehicle data, or characteristics of vehicle data, and to be able to make meaningful comparisons of whether or not the smart, or mobile phone, is being moved in concert with a steering device when that steering device is being moved to steer that vehicle when it is in motion, as is described in more detail below.

In Step 1103 "Phone & Vehicle Same?" a microprocessor resident in a smartphone may be programmed to determine if the motions calculated in Step 1102 are sufficient to conclude that the smart or mobile phone is being moved in concert with a steering device when that steering device is being moved to steer a vehicle in which the smartphone is while that vehicle is in motion.

If, in Step 1103, it is determined that the phone and vehicle steering device are moving in concert, the programmed module may then move to Step 1104 "Prevent Distracting Phone Functionality" and may prevent some or all phone functionality such as, but not limited to, talking, texting, receiving or initiating calls, playing games, looking for data on the internet, reporting data on the internet, interacting with navigational programs, or some combination thereof.

This prevention of functionality may be continued until a predetermined endpoint such as, but not limited to, the end of a time interval that may, for instance, range from 1 to 5 to 10 minutes, until the vehicle speed drops below a certain value that may, for instance, be 1, 2 or 5 mph, or if a further physical-interaction challenge task is successfully performed, or some combination thereof.

In a further preferred embodiment of the invention, determination that the phone and the vehicle steering device are, or appear to be, moving in concert may not directly trigger the prevention of functionality but may instead serve to trigger a further test such as, but not limited to, a physical-interaction challenge task of the type described above, the outcome of which may then be used to prevent, or not prevent, phone functionality.

Figure 7:
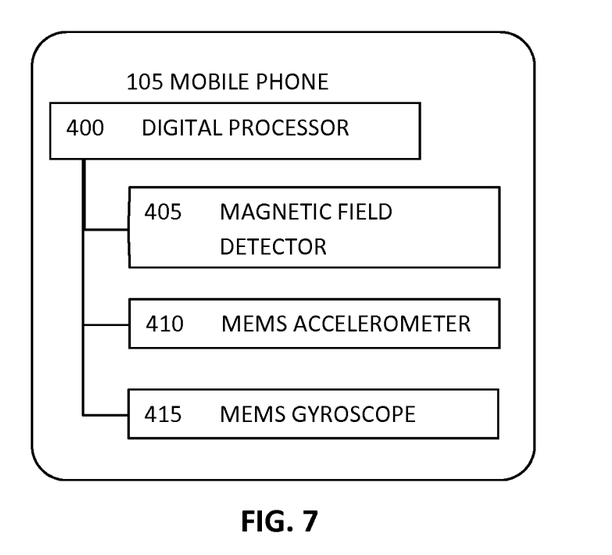
FIG. 7 shows a schematic diagram of sensors available in a typical smartphone.

FIG. 7 shows a schematic diagram of sensors available in a typical smartphone.

A typical smart or mobile phone 105 may include a digital processor 400 that may obtain data from a number of sensors that may be functionally connected to the digital processor 400 and may be resident on the phone. Those sensors may include, but are not limited to, a Hall magnetic field detector 405, a MEMs accelerometer 410, a Coriolis vibratory gyroscope 415 or some combination thereof. The mobile phone 105 may also be equipped to receive and interpret signal from GPS satellites for use in calculating location and, therefore, motion, including velocity.

A typical mobile phone 105 may for instance have accelerometers that may measure forces applied to the phone in three orthogonal directions. Readings from the accelerometers may be integrated to obtain a velocity of the phone, and may then be integrated again to obtain distance moved. Because of the double integration, the distance moved measurement taken solely from accelerometers may contain significant drift as noise in the raw accelerometer data may in integrated up as a drift signal, with typical MEMs accelerometers providing distance data that may have a drift of up to 20 cm/sec. The accelerometers may, when the vehicle is at rest, provide a gravitational vector indicating the direction of the Earth's gravity, that may then be factored out in subsequent readings to provide velocity in a place orthogonal to the direction of the gravitational vector.

The gravitational vector may also or instead be provided by a magnetic field sensor such as, but not limited to, a semiconductor Hall effect magnetic field detector 405 as the Earth's magnetic field has, at most geographic locations, a component in the direction of the gravitational field. Knowing the geographic location of the phone from, for instance, GPS data, the magnetic field sensor may, therefore, provide both direction and a gravity vector.

Figure 8:
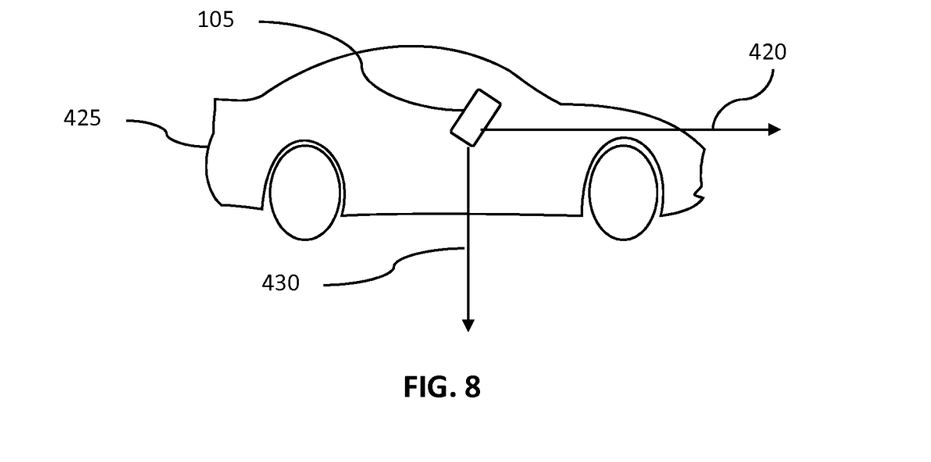
FIG. 8 shows a schematic side view of a smartphone in a travelling vehicle.

FIG. 8 shows a schematic side view of a smartphone in a travelling vehicle.

The mobile phone 105 may, for instance, be locating in a vehicle 425 that may be in motion and have a direction of motion 420 in a plane orthogonal to the local gravity vector 430.

By combining the signals available to the smartphone, a processor on board the phone may calculate information such as, but not limited to, the local gravity vector, the direction of motion of the phone, the orientation of the phone, and the change of orientation of the phone or some combination thereof. Moreover, knowing the gravity vector, and having accelerometers, gyroscopes, and magnetic field detectors that may each measure in three orthogonal directions, this information may be separated out into, for instance, velocity, orientation and changes in velocity and orientation in directions that may be in a plane orthogonal to the gravity vector or in a plane that may include the gravity vector, or a plane that may include both the gravity vector and the direction of motion.

Once the velocity in the plane orthogonal to the gravity vector exceeds some value that may be as little as 1 to 5 mph, the velocity may be assumed to represent the velocity of the vehicle in which the phone is located.

Figure 9:
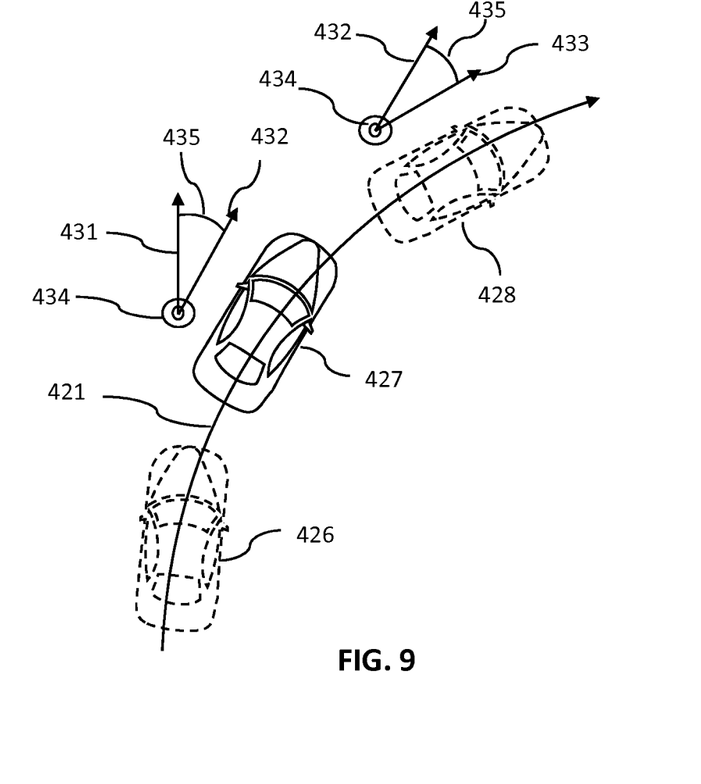
FIG. 9 shows a schematic plan view of a vehicle turning while travelling in a forward direction.

FIG. 9 shows a schematic plan view of a vehicle turning while travelling in a forward direction.

In FIG. 9, the vehicle is shown in three locations as it executes a right hand turn. The direction of motion 420 of the mobile phone in a plane orthogonal to a local gravity vector may be used to approximate the vehicles direction of motion in that same plane. Vector representations may then be used to determine the vehicle's orientation, the change of orientation and the rate if change of orientation.

For instance, alongside the vehicle at a second position 427, a vector representation is shown depicting the vehicle orientation vector 431 when the vehicle is in a first position and the vehicle orientation vector 432 when the vehicle is in a second position. This can be used to calculate the vehicular change of orientation 435 which may be expressed as an angle about an axis of rotation 434 of the vehicle. The axis of rotation 434 of the vehicle may be coincident with a local gravity vector.

Similarly, alongside the vehicle at a third position 428, a vector representation is shown depicting the vehicle orientation vector 432 when the vehicle is in the second position and the vehicle orientation vector 433 when the vehicle is in a third position. This can be used to calculate the vehicular change of orientation 435 which may be expressed as an angle about an axis of rotation 434 of the vehicle. The axis of rotation 434 of the vehicle may be coincident with a local gravity vector.

Figure 10:
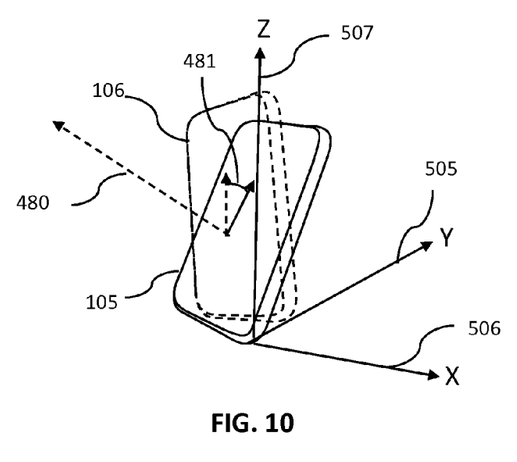
FIG. 10 shows a schematic view of a coordinate system of use in representing the orientation of a smartphone relative to a direction of motion.

FIG. 10 shows a schematic view of a coordinate system of use in representing the orientation of a smartphone relative to a direction of motion.

The relative-to-motion coordinate system may, for instance, be a Cartesian coordinate system having a "Y" axis that may be defined to be in the direction of motion 505. The "X" axis 506 and the "Z" axis 507 may then both be orthogonal to the direction of the motion and to themselves. In a preferred embodiment the "Z" axis may be in the direction of the gravity vector.

The rotation of the mobile phone 105 from it being in a first orientation to the mobile phone 106 being in a second orientation may then be represented in this relative-to-motion coordinate system as a change angle 481 about a phone rotation axis 480.

Both the phone rotation axis 480 and the change angle 481 may be obtained by combining appropriate data from the phone sensors, particularly from the phone gyroscopic data, and the phone accelerometer data, though this may be augmented with the magnetic field data and even with GPS data to help increase the accuracy and consistency of the results.

One method of determining whether or not a phone is being moved in concert with a steering structure that operates by rotation about a fixed axis, as is common in most automobiles which typically use a steering wheel for directional control, is to determine the phone rotation axis 480 as expressed within the relative-to-motion coordinate system described above.

If the vector representing the phone rotation axis 480 is a constant as the phone changes orientation, then this is a very strong indicator that the phone is being rested on a structure that is being moved about a fixed axis within the relative-to-motion coordinate system.

Figure 11:
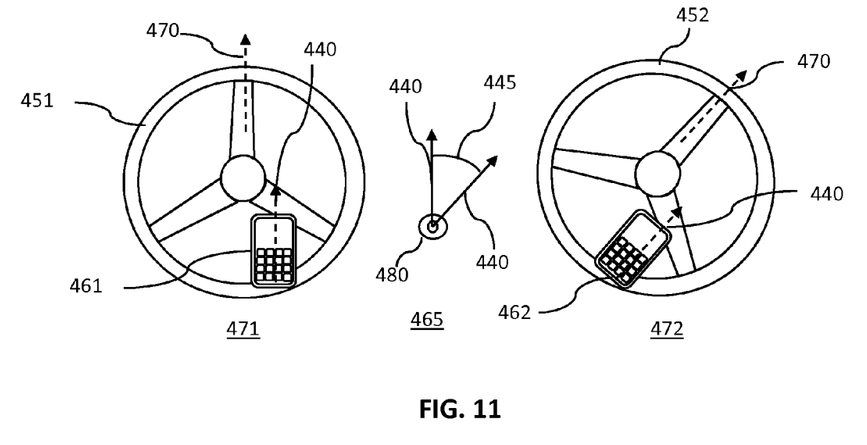
FIG. 11 shows a schematic view of a smartphone being moved in coordination with a vehicle steering device.

FIG. 11 shows a schematic view of a smartphone being moved in coordination with a vehicle steering device.

On the left side of FIG. 11, a phone and a steering 471 device are shown in a first orientation and on the right hand side the phone and the steering 472 device are shown in a second orientation.

The steering device 451 in the first orientation may be represented by a vector depicting the orientation 470 of the steering device, while the mobile phone 461 in the first orientation may be represented by a vector depicting the orientation 440 of the mobile phone.

Similarly, the steering device 452 in second orientation may be represented by a vector depicting the orientation 470 of the steering device, while the mobile phone 462 in the second orientation may be represented by a vector depicting the orientation 440 of the mobile phone.

The vector representation 465 of the phone's change in orientation is shown in the middle of FIG. 11. The change of orientation 445 of the mobile phone may, for instance, be represented by an angle of motion about a phone rotation axis 480.

The phone rotation axis 480 may be calculated by a program operating on the phone using sensor data, particularly the gyroscopic data, though that may be augmented by accelerometer data, and even by magnetic field data and GPS data for increased accuracy and consistency of results.

If the orientation of the phone, as expressed in a relative-to-motion coordinate system, is found to be consistent with the change of vehicle direction as expressed in a coordinate system fixed relative to the earth as depicted in, for instance, FIG. 9, that may be a strong indicator that the phone is being moved in concert with a steering device such as the steering wheel. By consistent with may be interpreted as that the same phone orientation occurs for a particular vehicle change of direction for simultaneous measurements taken at different points in time, i.e., the phone orientations match each other when the vehicle change of directions match each other. If such a consistency is found, it may be used as a trigger for disabling certain phone functionality that may be related to distracted driving such as, but not limited to, texting, talking and receiving or initiating calls or internet searches or some combination thereof. Alternately such a consistency may be used as a trigger for administering a test, such as, but not limited to, a dexterity test requiring two fingers on the phone, of the type described above, and only if the dexterity test fails, proceeding to disabling the mobile phone's distracting phone functionality.

In a further preferred embodiment of the invention, the phone may have access to sensor data from sensors attached directly to the vehicle. In such an instance, that data may be used to augment the phone sensor data, or the two sets of data may be compared to each other. In a straight comparison of data from the phone and from the vehicle, a consistency of any one of the data streams may be sufficient to warrant disabling the mobile phone's distracting phone functionality, or to trigger initiating a test such as, but not limited to, a two finger on the phone type test, and using the result of that test to determine whether or not to disable distracting phone functionality.

As described above, a determination that the mobile phone is being moved in concert with said steering device when that steering device is being moved to steer that vehicle in motion, may also or instead be made using only data available from sensors attached to the cellphone.

This may, for instance, be accomplished by, first detecting or measuring a local gravity vector 430 acting on the mobile phone. The phone sensor data may then be used to detect or measure a direction of motion of the mobile phone in a plane orthogonal to the local gravity vector. When the measured or detected velocity exceeds some low threshold, such as, but not limited to, 1 mph or 5 mph or 10 mph, the phone velocity may be taken as representing the vehicle velocity. The vehicle change of direction may, for instance, be expressed as an angle about a vehicle axis of rotation in in a coordinate system fixed relative to the earth.

The phone sensor data may then be used to detect or measure the orientation of the phone and that orientation may be represented in a frame of reference that is relative to the direction of motion.

If an angular change in direction of the vehicle is found to be consistent with a given orientation of the phone on a predetermined number of occasions this may be taken as sufficient evidence that the phone is being moved in concert with the vehicles steering device while the vehicle is in motion and may be a trigger to either disable the mobile phone's distracting phone functionality, or to initiate further tests requiring the phone users attention before determining whether or not to disable distracting phone functionality.

The predetermined number of occasions on which the phone orientation value matches, or is consistent with, the vehicle's change of direction may be as little as two but may also be any greater integer number. A larger number of predetermined required matches may, for instance, increase the reliability of the conclusion that the phone and steering device are moving in concert. The matches may also be required to occur separated by a suitable time interval which may be as little as one millisecond, but which may be one or more seconds as that may increase the reliability of the conclusion.

Once the phone functionality is disabled it may continue to be disabled for a predetermined length of time that may, for instance, be 1 minute, or 2 minutes or 5 minutes or 10 minutes, or until some further event occurs such as, but not limited to, the vehicle comes to a full stop, or its velocity is reduced below a certain speed that may, for instance, be 5 mph or 10 mph.

In a further preferred embodiment of the present invention, the phone sensor data may be used to detect or measure a change in orientation of the phone and that change in orientation may be represented as an angle of motion about a vector in a frame of reference that is relative to the direction of motion. If that vector representing the phone rotation axis is found to be consistent over time, this may be taken as sufficient evidence that the phone is being moved in concert with the vehicles steering device while the vehicle is in motion and may be a trigger to either disable the mobile phone's distracting phone functionality, or to initiate further tests requiring the phone user's attention before determining whether or not to disable distracting phone functionality.

One of ordinary skill in the art will appreciate that the various method of ascertaining whether or not a phone's motion is matching, or is consistent with, the motion of a steering device in a vehicle, may be used alone, or in tandem or serial conjunction with each other. Such combined use may, for instance, increase the level of confidence in making a correct determination of whether or not the phone and the steering device are being moved in concert.

Although this invention has been described primarily with respect to a cell phone, one of ordinary skill in the art will, however, appreciate that the app, or the methods that constitute the functionality of the app, may be applied to other devices such as, but not limited to, smartphones, tablets, laptop computers, e-readers or some combination thereof.

Although this invention has been described primarily with respect to preventing texting and driving, one of ordinary skill in the art will appreciate that the app and the methods that constitute the functionality of the app may also be applied to other distracting behavior that may occur with a cell phone such as, but not limited to, talking on the cell phone, listening on the cell phone, watching videos on the cell phone, searching for items such as music on the cell phone or some combination thereof.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A non-transitory machine-readable storage medium designed to prevent a user using distracting phone functionality while driving a vehicle, comprising:
   machine readable instructions, stored on a mobile phone memory or in the cloud, that enable said mobile phone to perform functions comprising:
      detecting a local gravity vector acting on said mobile phone;
      detecting a direction of motion of said mobile phone in a plane orthogonal to said local gravity vector;
      detecting an orientation of said mobile phone in a frame of reference relative to said direction of motion of said mobile phone; and
      combining said local gravity vector, said direction of motion and said orientation of said mobile phone to determine whether or not said mobile phone is being moved in concert with a steering device when said steering device is being moved to steer said vehicle in motion, and
   if said mobile phone is determined as being moved in concert with said steering device when said steering device is being moved to steer said vehicle in motion, preventing distracting phone functionality by disabling said mobile phone's distracting phone functionality, and continuing to prevent said distracting phone functionality for a further predetermined period of time.

2. The non-transitory machine-readable storage medium of claim 1 further comprising instructions for performing functions such that said step of combining further comprises:
   recording a first and a second vehicular change of orientation, said vehicular change of orientation being approximated as a component of a change of orientation of said mobile phone in a plane orthogonal to said local gravity vector;
   recording a first and a second directional orientation of said mobile phone, said directional orientation of said mobile phone being approximated as said component of said orientation of said mobile phone in a plane that is oriented perpendicular to said direction of motion of said cell phone and parallel to said gravity vector, and wherein said first directional orientation is recorded contemporaneously with said first vehicular change of direction, and said second directional orientation is recorded contemporaneously with said second vehicular change of direction; and
   if both said first and second vehicular change of orientation are equal, and said first and second directional orientation of said phone are equal, determining that said mobile phone is being moved in concert with a steering device when said steering device is being moved to steer said vehicle in motion.

3. The non-transitory machine-readable storage medium of claim 1 further comprising instructions for performing functions such that said step of combining further comprises:
recording a first and second relative change of orientation of said mobile phone, said relative change of orientation being a change of orientation expressed in said relative coordinate system having said direction of motion as an axis, and wherein said relative change of orientation may be expressed as a change angle about phone rotation axis; and
if the phone rotation axis of said first relative change of orientation is equal to the phone rotation axis of the phone rotation axis of said second relative change of orientation, determining that said mobile phone is being moved in concert with a steering device when said steering device is being moved to steer said vehicle in motion.

4. The non-transitory machine-readable storage medium of claim 1 wherein said detecting a local gravity vector comprises accessing a signal from a Hall magnetic field detector resident on said mobile phone.

5. The non-transitory machine-readable storage medium of claim 1 wherein said detecting a direction of motion comprises accessing a signal from a MEMs accelerometer resident on said mobile phone.

6. The non-transitory machine-readable storage medium of claim 1 wherein said detecting an orientation of said mobile phone comprises accessing a signal from a Coriolis vibratory gyroscope resident on said mobile phone.

7. The non-transitory machine-readable storage medium of claim 1 wherein said preventing distracting phone functionality further comprises administering, after determining that said mobile phone is being moved in concert with said steering device, a dexterity test requiring two fingers on the phone and only if said dexterity test fails, proceeding to disabling said mobile phone's distracting phone functionality.

8. A method of preventing a user using distracting phone functionality while driving a vehicle, comprising:
providing a smartphone having an accelerometer and a gyroscope;
providing a vehicle;
obtaining, using said accelerometer a direction of motion of said vehicle;
obtaining, using said gyroscope, a change of orientation of said smartphone;
expressing said change of orientation of said smartphone as a change angle about a phone rotation vector in a relative-to-motion coordinate system have one axis coincident with said direction of motion of said vehicle; and
if said phone rotation vector is constant over a measuring period of time, disabling distracting functionality on said smartphone.

9. The method of claim 8 wherein said measuring period of time is a period of 1 second or more.

10. A method of preventing a user using distracting phone functionality while driving a vehicle, comprising:
providing a smartphone having an accelerometer and a gyroscope;
providing a vehicle;
obtaining, using said accelerometer a direction of motion of said vehicle;
obtaining, using said accelerometer and said gyroscope a vehicle change of direction of said vehicle at one or more times expressed as an angle about an axis in a coordinate system fixed relative to the earth;
obtaining, using said gyroscope, a smartphone orientation of said smartphone at said same one or more times;
expressing said smartphone orientation as an angle with respect to a phone rotation vector in a relative-to-motion coordinate system have one axis coincident with said direction of motion of said vehicle; and
if said smartphone orientation and a corresponding one of said vehicle change of directions, both taken at a same time, are equivalent on a predetermined number of occasions, disabling distracting functionality on said smartphone.

11. The method of claim 10 wherein said predetermined number of occasions is two.

* * * * *